United States Patent [19]

Nakajima et al.

[11] Patent Number: 5,675,694
[45] Date of Patent: Oct. 7, 1997

[54] VIDEO DISK, RECORDING APPARATUS OF VIDEO DISK, AND ITS REPRODUCING APPARATUS

[75] Inventors: Takeshi Nakajima, Osaka; Shigeru Furumiya, Katano; Takashi Inoue, Osaka; Yoshinari Takemura, Settsu, all of Japan

[73] Assignee: Matsushita Electric Industrial Co., Ltd., Osaka, Japan

[21] Appl. No.: 172,569

[22] Filed: Dec. 22, 1993

[30] Foreign Application Priority Data

Dec. 22, 1992 [JP] Japan ................................. 4341916

[51] Int. Cl.$^6$ ............................. H04N 5/95; H04N 5/781
[52] U.S. Cl. ..................................... 386/86; 386/126
[58] Field of Search ......................... 358/342; 369/275.1, 369/275.3, 275.4, 111, 44.2; 360/77.08, 48; 386/70, 82, 86, 125, 126, 127; H04N 5/95, 5/781

[56] References Cited

U.S. PATENT DOCUMENTS

| | | | |
|---|---|---|---|
| 5,371,602 | 12/1994 | Tsuboi et al. | 358/335 |
| 5,375,116 | 12/1994 | Bailey | 369/275.3 |
| 5,418,773 | 5/1995 | Bakx et al. | 369/275.1 |
| 5,442,499 | 8/1995 | Emori | 360/77.08 |
| 5,453,974 | 9/1995 | Minoda et al. | 369/275.1 |

FOREIGN PATENT DOCUMENTS

| | | |
|---|---|---|
| 63-310293 | 12/1988 | Japan. |
| 3-129979 | 6/1991 | Japan. |

*Primary Examiner*—Robert Chevalier
*Attorney, Agent, or Firm*—Ratner & Prestia

[57] ABSTRACT

A disk medium is a video disk, being an optical recording medium possessing concentric or spiral tracks, in which one track is divided into P sectors, and group mark signals are recorded in every Q sectors.

17 Claims, 6 Drawing Sheets

FIG. 4(A) VIDEO SIGNAL C
FIG. 4(B) GROUP START SIGNAL D
FIG. 4(C) REDUCED SIGNAL
FIG. 4(D) GROUP SYNCHRONIZING SIGNAL G
FIG. 4(E) TRACK
FIG. 4(F) GROUP MARK DETECTION SIGNAL H

VIDEO DISK, RECORDING APPARATUS OF VIDEO DISK, AND ITS REPRODUCING APPARATUS

FIELD OF THE INVENTION

The present invention relates to a video disk for recording video signal by bit rate reduction, its recording apparatus and its reproducing apparatus, and more particularly presents means for finding a desired position quickly and easily when recording the image by bit rate reduction, and searching and playing it in trick mode.

BACKGROUND OF THE INVENTION

Recently the bit rate reduction technology is being developed for high efficiency coding in order to reduce the quantity of data by making of use correlation of video signal.

Various methods of high efficiency coding have been proposed, and, for example, the DCT coding method is widely employed, in which the picture is divided into plural blocks, and discrete cosine transform (DCT) is effected in every block, and the DCT coefficient is quantized and coded. To raise the rate of reduction, it is effective to use the interpicture correlation, not limited to the intrapicture correlation. Accordingly, plural pictures are coded efficiently as one group.

A picture of video signals is composed of frames and fields. For example, a case of reduction of K frames (K being 2 or larger integer) as a unit is described. At least one picture in a group (generally the beginning picture) is processed by intrapicture coding so as to complete coding within the picture, while other pictures are processed by interpicture coding the difference between the corresponding original picture and the picture predicted from the picture after intrapicture coding, or interpicture coding the difference between the corresponding original picture and the picture predicted from the picture after interpicture coding.

When decoding thus reduced data, the picture by intrapicture coding is decoded, and by using this decoded picture, it is necessary to sequentially decode the pictures by interpicture predictive coding.

Or, when coded video signals are recording in a medium such as video disk, trick play such as search and fast play is necessary when reproducing. In this case, it is not possible to reproduce from the field or frame undergoing interpicture coding, and accordingly it is required to reproduce by quickly and efficiently searching the intrapicture coded data.

Whether the reproduced data is intrapicture coded data or interpicture predictive coded data can be judged in a decoding circuit. Generally, the reproducing apparatus is designed to detect a reproduced signal from the recording medium, and decode the channel coded code, correct error, and decode by high efficiency coding. It hence takes a considerably delay time from reproduction of signal until judgement of intrapicture coded data. Therefore, it is difficult to perform trick play for search of intrapicture coded data at high speed.

Accordingly, a method of adding an interframe predictive coding mode signal to every picture was proposed in the Japanese Patent Provisional Publication No. 310293/1988.

This prior art unveils a method of judging the reproduced interframe predictive coding mode signal, and decoding only when judged to be intrapicture coding mode.

In this method, however, to detect the interframe predictive coding mode signal, it is necessary to continue to reproduce signals along the track. Hence, search cannot be done at very high speed.

A method of recording the address of the sector in which the beginning of the group of picture data reduced by the high efficiency coding in the header unit as a table was disclosed in the Japanese Patent Provisional Publication No. 129979/1991.

In this prior art, in the header unit, not only the beginning address, but also the coding mode and recording format are recorded and controlled in the disk. In such address control by header, the entire header unit must be changed every time new image data is recorded or deleted, and the address control is complicated. Or, when a write once disk is used as the recording medium, the header unit cannot be rewritten, and a new address control table must be added every time image data is added. Accordingly, a sufficient region must be preserved as the header unit for recording the address control table, and the region for recording image data is decreased.

On the other hand, when recording video signals on a conventional disk medium, generally, the disk is synchronized with the frame frequency of the video signal, and is rotated at a specific rotating speed (which is called constant angular velocity drive or CAV drive). By recording in this way, video signals of one frame can be recorded in one track, and the start point of each frame is aligned in the disk radial direction. Accordingly, the access is quick, and by jumping to other track at the seam of frames, fast play and other trick play can be done easily.

However, as mentioned above, when video signals reduced over plural frames (k frames) are synchronized with the frame frequency and recorded in a disk rotated at a specific rotating speed, data of one group is present over K revolutions. Since the video signal is expanded in every group of picture, it is not possible to decoded from that picture if accessing in the midst of K revolutions.

Or, when coding DCT coefficient by using variable length code, the quantity of data reduced from the picture is changed, and it is recorded at a constant rate, and hence the beginning position of the grouped image is not in constant period. To find the beginning of the picture group, it is required to reproduce the recorded signal, and decode to see if it is intrapicture coded signal or not, which requires a long access time.

The recording time of the disk rotated at a rotating speed synchronized with the frame frequency is determined by the track pitch, and it is hard to increase the recording time if there is an allowance in the recording density for the recorded signals.

It is also possible to record compressed signals of the high efficiency coding in one track on one revolution of the disk, but the quantity of data that can be recorded in one revolution is limited by the recording density of the disk, and hence it is necessary to increase the disk diameter or limit the recording rate. Accordingly, the apparatus becomes larger in size, or it is difficult to obtain video signals of satisfactory picture quality.

SUMMARY OF THE INVENTION

It is hence a primary object of the invention to present a video disk of recording format capable of quickly searching reduced and intrapicture coded video signal, and suited to access in group of pictures unit necessary for fast play or the like, a recording apparatus of the video disk, and its reproducing apparatus.

To achieve the object, the invention presents a video disk as a disk medium, being a disk-shaped optical recording medium possessing concentric or spiral tracks, wherein one track is divided into P sectors, and a group mark signal is recorded in every Q sectors (P, Q being 2 or larger integer), wherein the number of sectors P is changed in every zone by dividing into plural zones in the radial direction of the disk in order to further enhance the recording efficiency.

It is also characterized by recording data signals including one group of video signals reduced in Q sectors between two group mark signals.

In the range of the above constitution, group mark signals are recorded in every N tracks (N being 2 or larger integer) on positions nearly on a straight line in the radial direction of the disk.

In this recording, video signals can be reduced and recorded in a unit of K frames (K being 2 or larger integer), and the number of tracks N between group mark signals may be set to N=K−M (M being a positive integer including 0).

The recording apparatus for recording such signals in thus composed video disk is constituted by comprising:

- an encoding circuit for reducing video signals in a unit of plural pictures,
- a block circuit for writing a video signal reduced in the encoding circuit, and reading out in synchronism with the rotation of a video disk,
- a timing generating circuit for generating a group start signal corresponding to the picture group unit of video signal, a rotation synchronizing signal for controlling the rotating speed of the motor, and a group synchronizing signal, on the basis of the synchronizing signals contained in the video signal,
- a motor for rotating a video disk which is a disk medium,
- a motor control circuit for controlling the rotation of the motor,
- a rotation detector for detecting the rotation of the motor and issuing a rotation detection signal,
- an optical head for recording the recording signal in the disk medium, and reading out the group mark signal at least on the disk medium, and
- a group mark detection circuit for detecting the group mark signal on the video disk read by the optical head.

The video disk recorded in such constitution is reproduced by a video disk reproducing apparatus comprising:

- a motor for rotating a video disk which is a disk medium,
- a motor control circuit for controlling the rotation of the motor,
- a rotation detector for detecting the rotation of the motor,
- an optical head for reproducing the signal recorded on the video disk,
- a group mark detection circuit for detecting a group mark signal from the signals reproduced by the optical head,
- a decoding circuit for expanding the reduced video signal from the signal reproduced by the optical head from the video disk, and issuing a picture coding mode signal showing the beginning of the group of pictures as unit,
- a timing generating circuit for generating a group synchronizing signal corresponding to the position of the group of pictures on the video disk on the basis of the picture coding mode signal of the output of the decoding circuit, and
- a control circuit for controlling the optical head on the basis of the group synchronizing signal of the output of the timing generating circuit.

According to the described constitution of the invention, in the recording apparatus, when recording a video signal reduced on a disk medium, the motor control circuit rotates the disk medium at a specific rotating speed by the rotation synchronizing signal from the timing generating circuit and the rotation detection signal of the rotation detector, and the group mark detection circuit reproduces the group mark recorded on the video disk, and it is controlled by the motor control circuit so that the group mark detection signal from the timing generating circuit and the group synchronizing signal may be matched in phase. The encoding circuit gather into groups in every K frames on the basis of the group start signal from the timing generating circuit, and codes each picture at high efficiency. The reduced video signal is written into the block circuit, and is read out in synchronism with the rotation of the video disk. After starting reading in the block circuit, the delay until the video signal of the reduced group is recorded in the video disk is predetermined by the constitution of the apparatus, and therefore by generating the group synchronizing signal in harmony therewith, the reduced signal grouped in the recording region following the group mark signal on the video disk can be recorded.

When reproducing thus recorded,disk medium by a reproducing apparatus, the disk medium is rotated at a specific rotating speed by the rotation synchronizing signal from the timing generating circuit and the rotation detection signal from the rotation detector, the group mark signal recorded on the video disk is reproduced, and the phase is controlled by the motor control circuit so that the group mark detection signal and group synchronizing signal may be matched in phase. Since the timing generating circuit generates the group synchronizing signal on the basis of the picture coding mode signal from the decoding circuit, the optical pickup for accessing the video disk in the control circuit is controlled according to the command synchronizing signal on the basis of the group synchronizing signal.

At this time, the control circuit may either execute immediately when the next command comes during execution of reproduction command, or wait until the next command synchronizing signal comes, instead of executing immediately, and the decoding circuit continues decoding of the presently reproduced group of pictures in this period, so that the control circuit may execute the next command by the command decoding synchronizing signal after writing data necessary for decoding of the picture group at least in the buffer circuit, which is practically effective. The control circuit controls, while searching, so as to hold the final reproduced picture decoded before searching.

Thus, in the invention, the video disk can be rotated by always synchronizing the timing for reducing the video signals in every group of pictures and the timing for detecting the group mark signal on the video disk, and it is hence possible to access in the picture group unit by using the group mark signal.

Accordingly, in the recording apparatus of the invention, control of recording, erasing and rewriting can be easily realizing in picture group unit. In the reproducing apparatus, too, trick plays such as searching of picture and fast play can be easily realized. Having such constitution of video disk, the beginning position of the picture group can be predetermined by the group mark, and it is not necessary to control by the header or add mode signal.

BRIEF DESCRIPTION OF THE DRAWINGS

FIG. 1, including

FIG. 4, including FIGS. 4a–4f is a schematic diagram showing the signal timing of the recording apparatus in the embodiment of the invention.

FIG. 5, including FIGS. 5a–5f is a schematic diagram showing the signal timing of the reproducing apparatus in the embodiment of the invention.

DETAILED DESCRIPTION OF THE PREFERRED EMBODIMENTS

Referring now to the drawings, a first embodiment of the invention is described below.

First is given the embodiment of using an optical video disk as a disk medium for recording video signals by reducing.

Figure 1A:
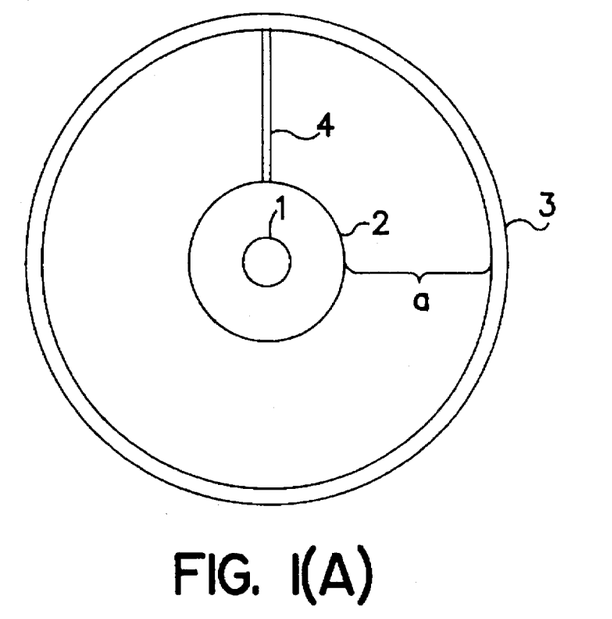
FIGS. 1a–1b is a format diagram showing the constitution of a video disk in an embodiment of the invention.

FIG. 1 is a format diagram showing the constitution of the video disk in the embodiment of the invention. In FIG. 1 (a) showing the entire format of video disk, numeral 1 is a central hole, 2 is an most inside circumferential track, and 3 is an most outside circumferential track, and a region a between them is a recording region of data. Inside the video disk, a recording layer for writing information by optical means is formed.

Figure 1B:
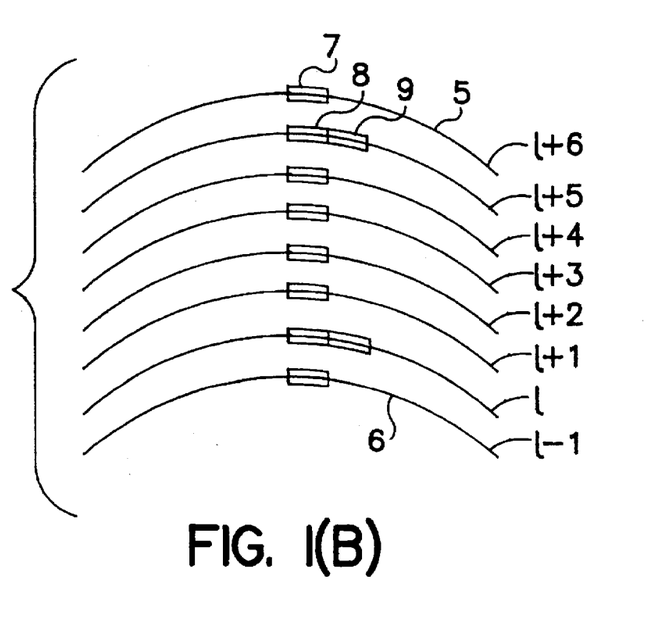

In the region a, tracks are formed concentrically or spirally. On the track of a region 4 nearly aligned in the radial direction of the video disk, a header signal of the track is preliminarily formed at the same time when forming the video disk, or is recorded in this position when recording the signal. The vicinity of the region 4 is magnified in FIG. 1 (b). Arcs shown between reference numerals 5 and indicate tracks. In each track, for example, in the regions in dictated by 7 or 8, the header information such as address of track is recorded. In the region indicated by reference numeral 9 in every N tracks, a group mark signal is recorded in the same manner as of header signal. In this case, N=5.

Figure 2:
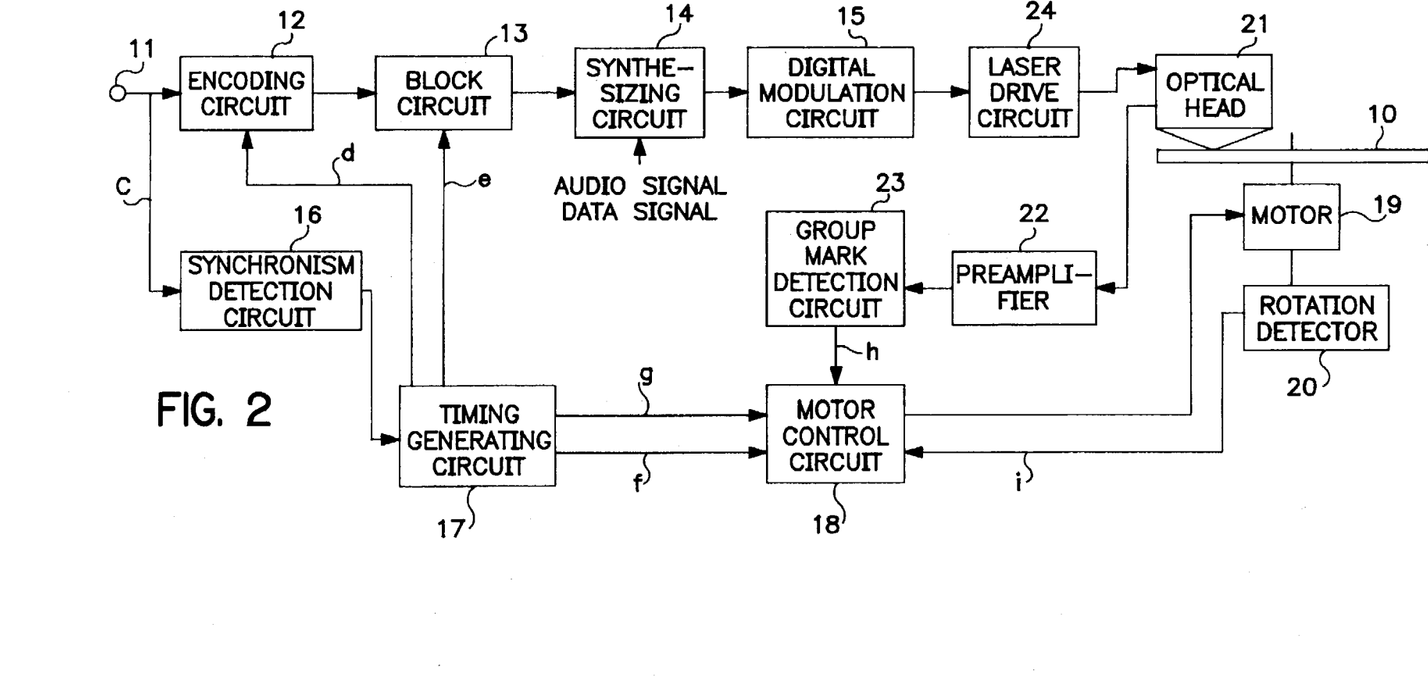
FIG. 2 is a block diagram showing the constitution of a signal processing unit of a recording apparatus of video disk in the embodiment of the invention.

Next is described an embodiment of the recording apparatus for recording video signals in the video disk by reducing. FIG. 2 is a block diagram showing the constitution of the signal processing unit of the recording apparatus of video disk in the embodiment of the invention.

In FIG. 2, a video signal c is entered in a terminal 11. A synchronism detection circuit 16 detects a horizontal synchronizing signal and a vertical synchronizing signal from the input video signal c. A timing generating circuit 17 generates various timing signals on the basis of the synchronizing signals detected by the synchronism detecting circuit 16. The timing generating circuit 17 feeds a group start signal d into an encoding circuit 12. The encoding circuit 12 gathers video signals c into groups in every K frames according to the group start signal d, and codes each picture at high efficiency. The reduced video signal is written into a block circuit 13, and is read out according to a read-out signal e from the timing generating circuit 17, and added to a synthesizing circuit 14, and the reduced video signal is herein synthesized with data signals showing the audio signal data, or showing program address and the like.

Thus composed data signals are coded for recording in a digital modulation circuit 15 so as to be suited to the recording medium. A laser driving circuit 24 modulates the laser output from an optical head 21 according to the modulated data signal. A video disk 10 is rotated by a motor 19 controlled by a motor control circuit 18 as described later. The optical head 21 emits the laser light modulated by the laser driving circuit 24 to the video disk 10, and records the data signal. The optical head 21 also receives the reflected light from the video disk 10, and reproduces the signal on the video disk 10. The reproduced signal is amplified by a preamplifier 22. A group mark detecting circuit 23 detects a group mark signal from the reproduced signals, and issues a group mark detection signal h.

The timing generating circuit 17 moreover generates a rotation synchronizing signal f and a group synchronizing signal g in order to rotate the video disk at a specified rotating speed. A rotation detector 20 detects the rotating speed of the motor, and generates a rotation detection signal 1. The motor control circuit 18 controls so that the rotating speed of the motor may be the specified value by using the rotation synchronizing signal f from the timing generating circuit 17 and the rotation detection signal i from the rotation detector 20, and also controls the rotation phase of the motor so that the group synchronizing signal g from the timing generating circuit 17 and the group mark detection signal h from the group mark detection circuit 23 may be matched in phase.

Thus, according to the embodiment, the video disk can be rotated by always synchronizing the timing for reducing the video signal in every picture group, and the recording region on the video disk, and the data signal of the reduced picture group can be recorded in a specified region on the video disk. Hence, control of recording, erasing and rewriting can be easily realized in the picture group unit.

Figure 3:
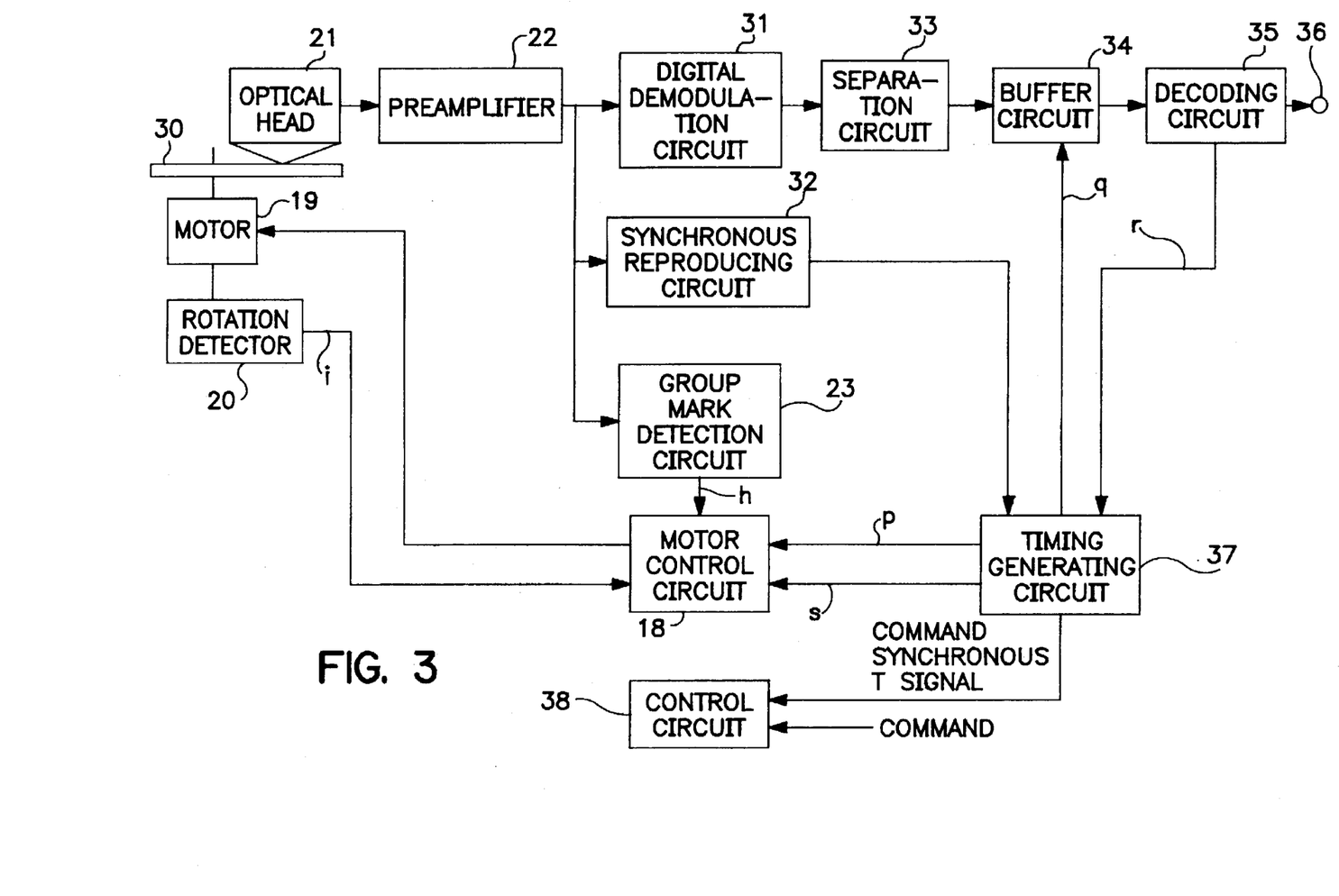
FIG. 3 is a block diagram showing the constitution of a signal processing unit of a reproducing apparatus of video disk in the embodiment of the invention.
Figure 4A:
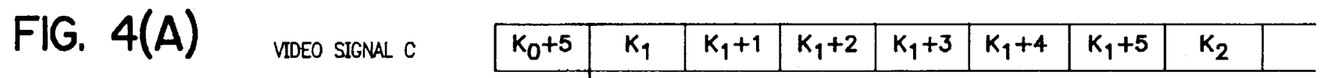
Figure 4B:
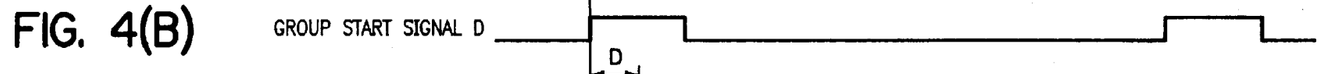
Figure 4C:
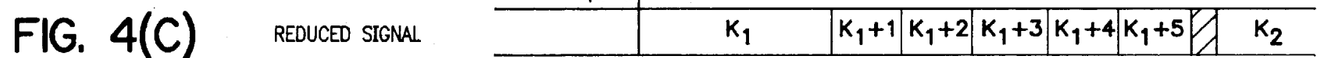
Figure 4D:
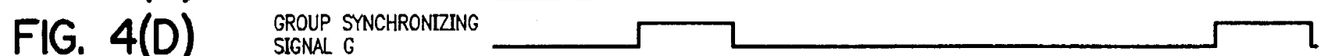
Figure 4E:
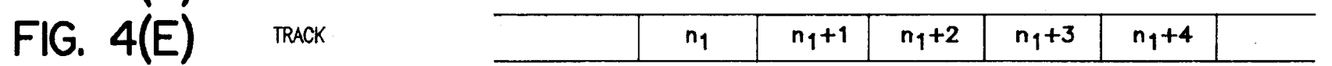
Figure 4F:
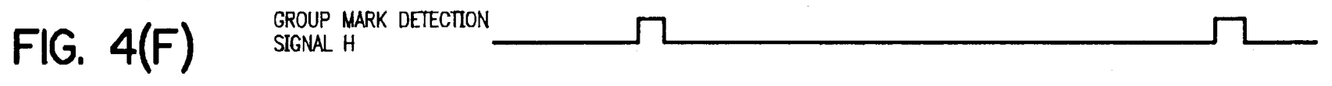

The following description relates to an embodiment of the reproducing apparatus for reproducing the reduced video signals from the video disk. FIG. 3 is a block diagram showing the constitution of the signal processing unit in the reproducing apparatus in the invention. In FIG. 3, constituent elements of the same functions as in FIG. 2 are identified with same reference numerals.

In FIG. 3, a timing generating circuit 37 generates various timing signals in synchronism with a reference clock or a synchronizing signal from outside as required. The timing generating circuit 37 generates a rotation synchronizing signal p for rotating the video disk at a specific rotating speed. A rotation detector 20 detects the rotating speed of the motor and generates a rotation detection signal i. A motor control circuit 18 control so that the rotating speed of the motor may be the specified value by using the rotation synchronizing signal p generated from the timing generating circuit 37 and the rotation detection signal i from the rotation detector 20. Thus, a video disk 30 is rotated at a specific rotating speed by a motor 19. An optical head 21 emits light beam to the surface of the video disk 30, and receives the reflected light from the video disk 30, and reproduces the recorded signal by the change of quantity of reflected light. The light beam of the optical head 21 is controlled in focus and tracking by a known method so as to run along the track of the signal recorded on the video disk. The reproduced signal is amplified by a preamplifier 22, and from its output, a synchronous reproducing circuit 32 generates the clock and synchronizing signal synchronized with the reproduced signal from the reproduced digital signal, and supplies into the timing generating circuit 37. A group mark detection circuit 23 detects a group mark signal from the reproduced signals, and issues a group mark detection signal h. A digital demodulation circuit 31 decodes the reproduced channel coded signal, and from the output, a separating circuit 33 separates the decoded data signals into video signals, audio signals, and data signals. The separated video signals are written into a buffer circuit 34, and are read out according to a read-out signal q from the timing generating circuit 37. A decoding circuit 35 expands the reduced video signal, and issues a picture coding mode signal r showing the beginning of a group of pictures. The timing generating circuit 37 generates a group synchronizing signal s on the basis of the picture coding mode signal r. The motor control circuit 18 controls so that the rotating speed of the motor may be a specified value as mentioned above, and controls the rotation phase of the motor so that the group synchronizing signal s from the timing generating circuit 37 and the group mark detection signal h from the group mark detection circuit 23 may be matched in phase.

By thus controlling the rotation phase of the video disk, the video disk can be rotated by always synchronizing the timing for expanding the video signals in every picture group and the recording region on the video disk.

The timing generating circuit 37 issues a command synchronizing signal t to a control circuit 38 according to the picture coding mode signal r. To the control circuit 38, commands for search, fast play and the like are given. The control circuit 38 executes the command in synchronism with the command synchronizing signal t from the timing generating circuit 37. In searching, therefore, the beginning of a group of pictures may be easily detected by using the group mark signal.

Described below is an operation in the case of receiving a command for searching other picture and reproducing while reproducing, for example, images continuously. The control circuit 38 does not execute the command immediately, but waits for a next command synchronizing signal t. In this period, the decoding circuit 35 continues decoding of the presently reproduced picture group. At least, in a buffer circuit 34, after writing the data necessary for decoding of the picture group, the command synchronizing signal t is sent in, and the control circuit 38 executes the search command. Accordingly, the control circuit 38 sends out a specific control signal to an optical control circuit and transfer control circuit (neither shown) of the optical head 21, and tracking control is canceled, and the optical head is moved, tracking control is started at a desired position, and the group mark signal of the desired picture group is searched. After the desired group mark signal is detected by the group mark detection circuit 23, the operation returns to the ordinary reproduction.

By thus synchronizing the execution of the command with the reproduction in each group of pictures, missing of video signal in the group of pictures, or difficulty in decoding due to failure in reproducing from the beginning of the group of pictures can be prevented.

In the period of execution of search, it is also possible to add control, such as holding of the final reproduced picture by the decoding circuit 35 or the like.

This embodiment is constituted so as to wait for execution of the command until data necessary for decoding of the group of pictures is written in the buffer circuit 34, but it is not limitative, and when a quick search is required, it is possible to constitute so as to execute the command immediately, and search in the picture group unit.

A second embodiment is described below, in which the rotating speed of the video disk and the frame frequency of picture are different. The rotating speed of the video disk is supposed to be R (revolutions/sec), and the frame frequency of picture is F (frames/sec). Video signals are reduced in a unit of K frames (K being 2 or larger integer). The period of group of pictures is K/F (sec). The recording rate is set so that the recording signal consisting of reduced video signals and other additional information (audio signal, data signal) may be recorded in the time not longer than the period of the group of pictures. As the method of reduction, in the method in which the quantity of data after reduction varies depending on pictures, for example, the quantity of data after reduction is monitored by an encoder circuit, and it is operated so that the quantity of data may not exceed by changing the subsequent parameters. Thus generated recording signals for K frames are recorded in N tracks on the video disk. In this case, the rotating speed of the video disk is expressed as follows.

$$R=(N/K) \times F \qquad (1)$$

When the rotating speed of the video disk is same as tile frame frequency, R=F. When the recording density of the video disk is high, data more than the data quantity of recording signals in one group of pictures can be recorded in a region of N tracks of video disk. In this embodiment, therefore, the number of tracks N between group mark signals is set as N=K−M (M being a positive integer including 0), and by defining M≧1, it is applicable to high recording density medium. In this case, the rotating speed of the video disk is expressed as follows.

$$R=\{(K-M)/K\} \times F \qquad (2)$$

By rotating the video disk at this rotating speed, the beginning position of each group of pictures may be aligned in the radial direction of the video disk.

A practical example is shown below. The frame frequency F of video signal is supposed to be 30 (frames/sec), and the number of frames K in a group to be reduced is 6 (frames). When the number of tracks N to record them in is supposed to be 5 (tracks), the rotating speed R of the video disk is 25 (revolutions/sec) from equation (1).

The timing of each signal in the recording apparatus is shown in FIG. 4. In FIG. 4, (1) shows an input video signal c.
(2) shows a group start signal d of a timing generating circuit 17; according to the rise thereof, an encoding circuit 12 reduces from frame $k_1$ to frame $k_1+5$ as one group.
(3) shows a recording signal including a reduced video signal. The recording signal is delayed by time D by coding processing for reduction or coding processing for recording. The beginning picture in the group is processed by intrapicture coding, while other pictures are processed by interpicture predictive coding for predicting from the intrapicture coded picture. Incidentally, since the data quantity after reduction is controlled so as not to exceed the period of the group, a blank portion as indicated by shaded area may be left over. In this portion, for example, amble signals repeating 1 and 0 are recorded. The timing generating circuit 17 generates a group synchronizing signal g shown in (4) by coinciding with the beginning position of each group of recording signal. On the video disk, group marks are recorded in every five tracks. The video disk is rotated so that the rise of the group mark detection signal h detected by the group mark detection circuit 23 through the optical head 21 and the rise of the group synchronizing signal may be matched. By thus controlling, the grouped video signal (from frame k1 to frame k1+5) can be recorded in the corresponding tracks (from track $n_1$ to track $n_1+4$) on the video disk.

Figures 5A, 5B:
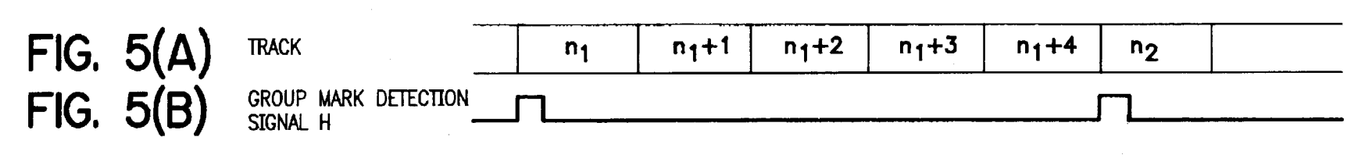
Figures 5C, 5D:
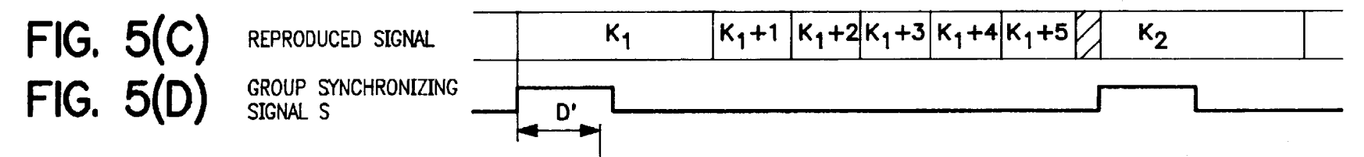
Figures 5E, 5F:
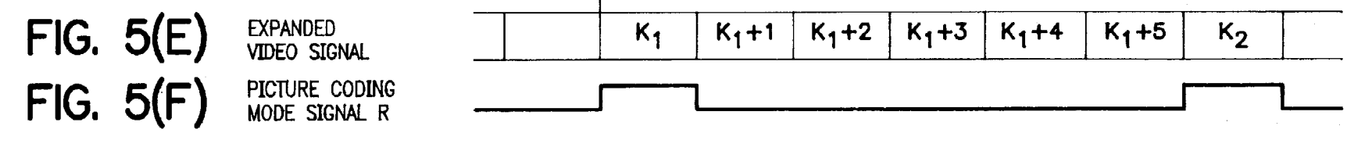

The timing of each signal in the reproducing apparatus is shown in FIG. 5. In FIG. 5, (1) shows tracks on the video disk.

(2) shows a group mark detection signal h; during the rise thereof, reduced video signals in one group are contained from track n1 to track n1+4.

The video disk is controlled in rotation so that the rise of the group synchronizing signal s shown in (4) and the rise of the reproduced group mark detection signal h shown in (2) may coincide with each other.

(3) shows a reproduced signal. The grouped video signals (from frame $k_1$ to frame $k_1+5$). The reproduced signals are delayed by time D' by decoding process of coding for recording or expansion process.

(5) shows an expanded video signal. When decoding a reduced signal, the beginning picture of each group can be distinguished.

Accordingly, the decoding circuit 35 generates a picture coding mode signal r shown in (6). Since the delay time D' of the picture coding mode signal r relative to the group synchronizing signal s can be predetermined, the timing generating circuit 37 can generate the group synchronizing signal s depending on the picture coding mode signal r.

By thus controlling, the video disk can be rotated by always synchronizing the timing of expanding the video signal in each group of pictures and the recording region on the video disk.

Therefore, in the embodiment, the video disk can be rotated at a slower rotating speed than the frame frequency of the video signal, and the beginning position of each group can be aligned and recorded, so that the recording density of the medium can be utilized effectively.

In the embodiment, the picture group for reducing video signals is K frames, but the picture group may be set, for example, in the field.

In the embodiment, the delay time of the video signal and recording signal or the delay time of reproduced signal and expanded video signal is explained as a fixed time, but it is not limitative, and the phase of the group synchronizing signal can be also set in the case where the delay time varies, by installing memories in the block circuit 13 of the recording apparatus and in the buffer circuit 34 of the reproducing apparatus, and controlling the timing of writing and reading.

Incidentally, in the embodiment, the group mark signals are aligned nearly in the radial direction of the video disk, but this is not limitative and, for example, the track may be divided into sectors, and group mark signals may be disposed in every plural sectors.

Figure 6:
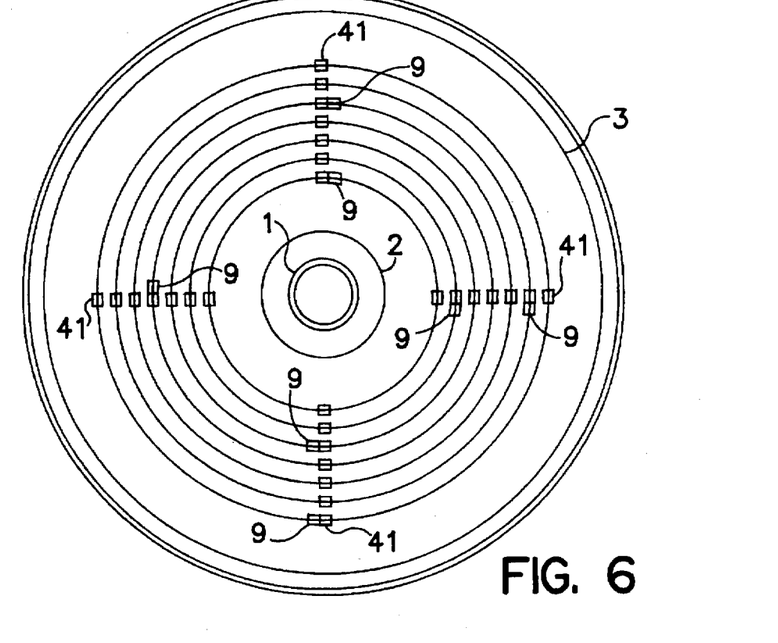
FIG. 6 is a format diagram showing the constitution of a video disk in other embodiment of the invention.

FIG. 6 is a format diagram showing the constitution of other embodiment of the video disk of the invention. In FIG. 6, the parts given the same reference numbers as in FIG. 1 indicate parts having the same functions. In FIG. 6, each track is divided into P sectors, or four sectors in this case. At the beginning of each sector, a sector header signal 41 is recorded. For example, when recording one group of reduced video signals into Q sectors (both P, Q being 2 or larger integer), or five sectors in this case, a group mark recording region 9 is set in every five sectors. In that case the number of sectors Q between group mark signal is set to Q/P=K−M (M being a positive integer including 0). In such setting, the group mark signals are not arranged linearly in the radial direction of the video disk.

Figure 7:
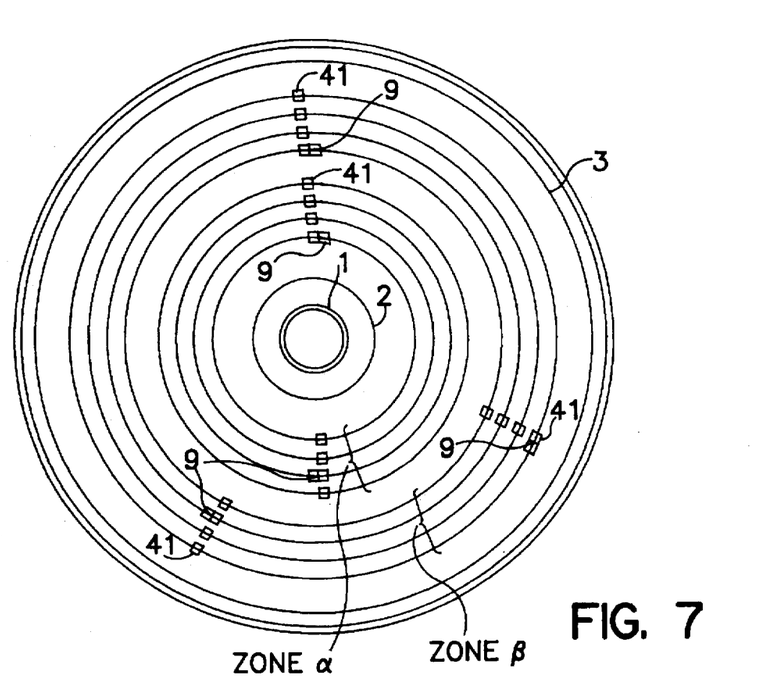
FIG. 7 is a format diagram showing the constitution of a video disk in a different embodiment of the invention.

FIG. 7 is a format diagram showing the constitution of a different embodiment of the video disk of the invention. In FIG. 7, the parts given the same reference numbers as in FIG. 1 indicate parts having the same functions. In FIG. 7, by dividing into zones in every plural tracks, the track of each zone is divided into a different number of sectors. That is, it is characterized by that the number of sectors P differs in each zone. Such disk is effective because the recording density is equalized in each zone. The length of sector may be set constant in each zone, and the same data quantity can be recorded at the same recording density. For example, in zone α, each track is divided into two sectors, and in zone β, each track is divided into three sectors. In this case, when recording one group of reduced video signals into five sectors, a group mark recording region 9 is set in every five sectors. In such setting, too, the group mark signal is not arranged in the radial direction of the video disk.

In the foregoing embodiments, using a rewritable video disk, group marks signals are preliminarily recorded in the format described herein, but it is not limitative, and for example, group mark signals may be recorded at the same time when recording video signals. In this case, the timing signal generated by the timing generating circuit 17 in FIG. 2, or example, the group start signal may be adjusted in phase or pulse width in a group mark generating circuit not shown, and fed into the laser driving circuit 24, and recorded in the video disk by the head 21.

In fabrication of video disk for playing only, similarly, it is also possible to constitute so as to record the group mark signal when recording data signals.

What is claimed is:

1. A video disk for use with a reproducing apparatus including a motor for routing said disk, said disk being a disk-shaped optical recording medium, comprising:

(a) a plurality of tracks including one of a) a plurality of concentric tracks and b) a plurality of spiral tracks, at least one of said plurality of tracks divided into P sectors, P being an integer greater than 1, (b) a plurality of header signals, each formed on a respective one of said plurality of tracks, and (c) a plurality of group mark signals for controlling rotation phase of said motor, each recorded in every N of said plurality of tracks, N being an integer greater than 1, and recorded at every Qth sector, Q being an integer greater than 1.

2. A video disk of claim 1, further comprising a plurality of zones, said plurality of zones resulting from a partitioning of the video disk in its radial direction, at least one of said plurality of zones containing the plurality of tracks wherein the number of sector P is changed in each one of said plurality of zones.

3. A video disk of claim 1, wherein a group of data signaling bit packets, including a group of reduced video signaling bit packets, are recorded in Q sectors between two group mark signals.

4. A video disk of claim 1, wherein a plurality of video signaling bit packets are reduced and recorded in a unit of K frames, an integer greater than 1, and a number of sectors Q between group mark signals is such that Q/P=K−M, M being a positive integer including 0.

5. A video disk of claim 1, wherein the plurality of group mark signals are recorded at the same time as the video signaling bit packets.

6. A video disk of claim 1, wherein header information is recorded one of before and after at least one of said group mark signals.

7. A video disk recording apparatus for reducing a plurality of video signals into a plurality of picture groups, and recording said plurality of picture groups into the video disk of claim 1, and further comprising:

(a) an encoding circuit for reducing a plurality of video signaling bit packets into a unit comprised of a plurality of pictures, (b) a block circuit for writing one of said plurality of video signaling bit packets reduced in the encoding circuit, and reading out in synchronism with the rotation of said video disk, (c) a timing generating circuit for generating a group start signal corresponding to a picture group unit of said plurality of video signaling bit packets, a rotation synchronizing signal for controlling a rotating speed of a motor, and a group synchronizing signal, based on the synchronizing signals contained in the video signaling bit packets, (d) a motor control circuit for controlling a rotation of the motor, (e) a rotation detector for detecting the rotation of the motor and issuing a rotation detection signal, (f) an optical head for recording a recording signaling bit packet in the disk medium, and reading out the group mark signal at least on the disk medium, and (g) a group mark detection circuit for detecting the group mark signal on the video disk read by the optical head.

8. A video disk recording apparatus of claim 7, wherein the motor control circuit:

(a) controls the rotating speed of the video disk through the motor by the rotation detection signal produced by the rotation detector and the rotation synchronizing signal generated by the timing generating circuit, and (b) synchronizes a rotation phase of the video disk through the motor by the group mark detection signal produced by said group mark detection circuit and the group synchronizing signal produced by the timing generating circuit.

9. A video disk reproducing apparatus for reproducing video signals recorded in the video disk of claim 1 in which said video signals are reduced into a plurality of picture groups, and further comprising:

(a) a motor control circuit for controlling the rotation of the motor, (b) a rotation detector for detecting the rotation of the motor and issuing a rotation detection signal, (c) an optical head for reproducing a plurality of signaling bit packets recorded on the video disk, (d) a group mark detection circuit for detecting a group mark signal from the plurality of signaling bit packets reproduced by the optical head, (e) a decoding circuit for expanding a reduced video signaling bit packet from the signaling bit packet reproduced by the optical head from the video disk, and issuing a picture code mode signal showing the beginning of a group of pictures as a unit, (f) a timing generating circuit for generating the group synchronizing signal corresponding to a position of the picture group on the video disk based on the picture code mode signal output by the decoding circuit and a rotation synchronizing signal for controlling a rotating speed of the motor, and (g) a control circuit for controlling the optical head based on the group synchronizing signal output by the timing generating circuit, wherein the control circuit affects control of position searching and jumping on the video disk by the optical head in a recording signal unit corresponding to the picture group.

10. A video disk reproducing apparatus of claim 9, wherein the motor control circuit controls the rotating speed of the video disk through the motor by the rotation detection signal produced by the rotation detector and the rotation synchronizing signal generated by the timing generating circuit, and also synchronizes the rotation phase of the video disk through the motor by the group mark detection signal produced by the group mark detection circuit and the group synchronizing signal produced by the timing generating circuit.

11. A video disk reproducing apparatus of claim 9, wherein the control circuit does not execute immediately when a next command arrives during execution of a reproduction command, but waits until the next command synchronizing signal arrives, and the decoding circuit continues decoding the presently reproduced group of pictures in this period, such that the control circuit may execute the next command after the data necessary for decoding of the group of pictures has been written at least in a buffer circuit.

12. A video disk reproducing apparatus of claim 9, wherein the control circuit holds a final reproduced picture decoded before searching.

13. A video disk of claim 1, wherein the plurality of group mark signals are formed at the same time as the disk-shaped optical recording medium.

14. A video disk of claim 1, wherein each one of said group mark signals is only recorded at every N tracks.

15. A video disk recording apparatus for encoding a plurality of video signaling bit packets into a plurality of picture groups and for recording said plurality of picture groups onto a video disk, said video disk recording apparatus including a motor for rotating said disk, said apparatus comprising:

(a) a plurality of tracks on said video disk, at least one of said plurality of tracks divided into P sectors, P being an integer greater than 1, (b) a plurality of header signals, each formed on a respective one of said plurality of tracks, and (c) a plurality of group mark signals on said video disk for controlling rotation phase of said motor, each recorded in every N of said plurality of tracks, N being an integer greater than 1, and recorded by said video disk recording apparatus at every Qth sector, Q being an integer greater than 1.

16. A video disk recording apparatus according to claim 15, wherein each one of said group mark signals is only recorded at every N tracks.

17. A video disk for use with a reproducing apparatus including a motor for rotating said disk, said disk being a disk-shaped optical recording medium possessing a spiral track, comprising:

(a) a spiral track divided into P sectors ordinally numbered from 1 to P, P being an integer greater than 1, (b) a plurality of header signals, each formed on a respective one of said P sectors, and (c) a plurality of group mark signals for controlling rotation phase of said motor, at least one of said plurality of group mark signals recorded at every Qth sector, Q being an integer greater than 1 and less than or equal to P.

* * * * *